(12) United States Patent
Nagao et al.

(10) Patent No.: US 6,254,004 B1
(45) Date of Patent: Jul. 3, 2001

(54) TERMINAL UNIT IN WHICH WATERPROOF EFFECT IS IMPROVED

(75) Inventors: Hiroshi Nagao; Isao Ariga, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/116,469

(22) Filed: Jul. 16, 1998

(30) Foreign Application Priority Data

Jul. 18, 1997 (JP) .................................................. 9-193568
Jul. 8, 1998 (JP) .................................................. 10-193281

(51) Int. Cl.⁷ .................................................. G06K 13/00
(52) U.S. Cl. .......................... 235/482; 235/380; 235/379
(58) Field of Search .................................. 235/379, 380, 235/382, 383, 384, 482, 483

(56) References Cited

U.S. PATENT DOCUMENTS

| 4,643,333 |   | 2/1987  | Martin . |
| 4,788,420 | * | 11/1988 | Chang et al. ......................... 235/483 |
| 4,795,896 |   | 1/1989  | Prell . |
| 5,195,133 | * | 3/1993  | Kapp et al. ........................... 380/9 |
| 5,233,547 | * | 8/1993  | Kapp et al. ...................... 364/705.02 |
| 5,256,867 | * | 10/1993 | Chen .................................... 235/484 |
| 5,265,951 | * | 11/1993 | Kumar ................................ 312/223.2 |
| 5,371,348 | * | 12/1994 | Kumar et al. ..................... 235/472.01 |
| 5,408,078 | * | 4/1995  | Campo et al. ......................... 235/380 |
| 5,426,286 | * | 6/1995  | Nair et al. ............................. 235/449 |
| 5,484,989 | * | 1/1996  | Kumar et al. ......................... 235/435 |
| 5,505,289 | * | 4/1996  | Watabe et al. ........................ 194/206 |
| 5,532,466 | * | 7/1996  | Konno et al. ......................... 235/441 |
| 5,603,078 | * | 2/1997  | Henderson et al. ................... 455/5.1 |
| 5,698,832 |   | 12/1997 | Someya et al. . |
| 5,748,511 | * | 5/1998  | Mansutti et al. .................. 364/708.1 |
| 5,892,210 | * | 4/1999  | Levasseur ............................ 235/380 |

FOREIGN PATENT DOCUMENTS

| 0389730 A2 | 10/1990 | (EP) . |
| 2006535    | 5/1979  | (GB) . |
| 2316238    | 2/1998  | (GB) . |
| 8-292997   | 11/1996 | (JP) . |
| WO 93/13498 A1 | 7/1993 | (WO) . |

* cited by examiner

Primary Examiner—Karl D. Frech
(74) Attorney, Agent, or Firm—Armstrong, Westerman, Hattori, McLeland & Naughton, LLP

(57) ABSTRACT

A terminal unit has a mechanism processing an information recording card and a slit into which the card is inserted. The slit is provided on a side surface of said terminal unit. A slit upper portion in an upside of the slit overhangs outward with respect to a slit lower portion at a underside of the slit.

14 Claims, 19 Drawing Sheets

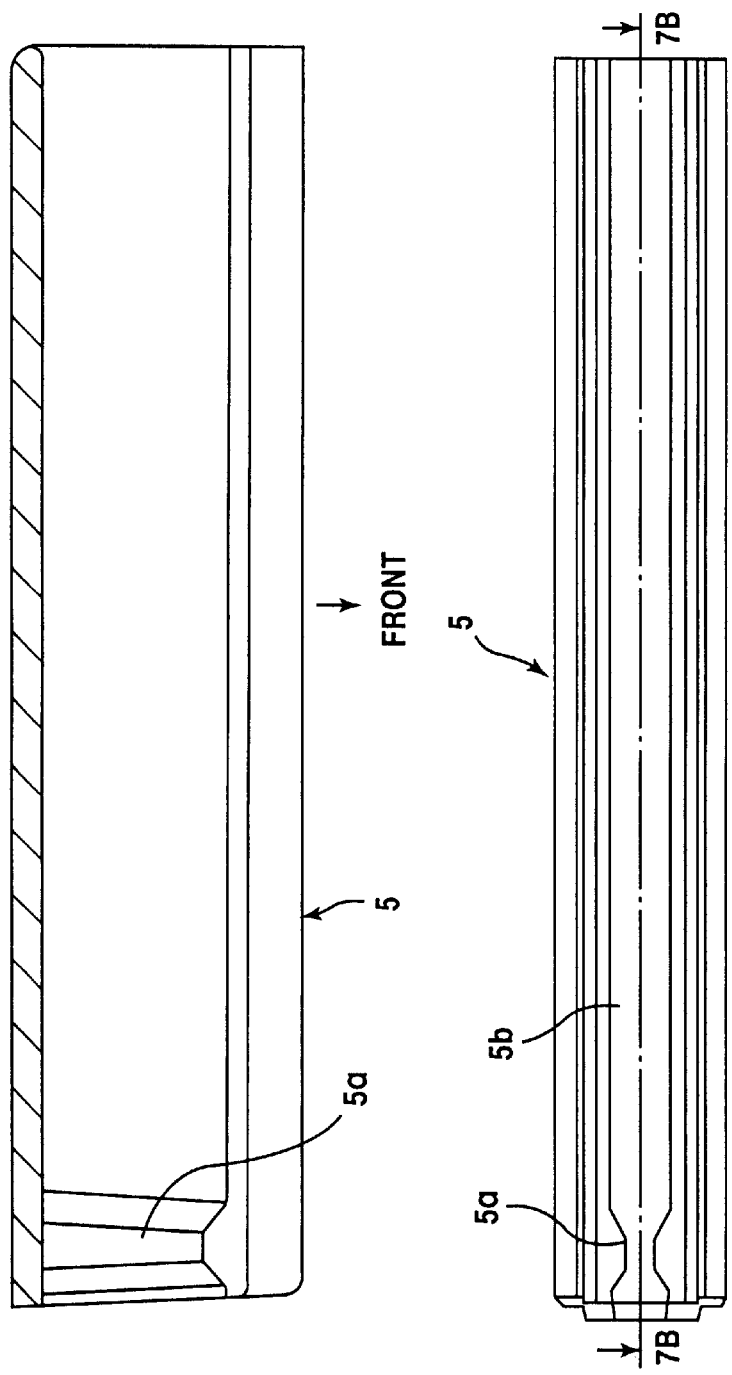

TERMINAL UNIT IN WHICH WATERPROOF EFFECT IS IMPROVED

BACKGROUND OF THE INVENTION

1. Field of the Invention

The present invention relates to a terminal unit for having a card reading unit reading cards, such as magnetic cards and IC cards. The present invention also relates to a POS terminal, and more particularly to a POS terminal in which a card is processed. A feature of the present invention is in a structure of a housing of the terminal unit.

2. Description of the Related Art

In recent years, the number of kinds of cards, such as credit cards and cash cards is increasing. It is thus desired that various types of terminals can process cards. Magnetic cards and IC cards are popularized.

A card reading unit generally means the so-called card reader. However, in the specification, the card reading unit means not only the so-called card reader but also a unit such as a card read/write unit.

A description will be given of a POS terminal unit as a conventional case. Other types of terminal units have substantially the same construction as the POS terminal unit.

Conventionally, a type of POS terminal unit in which use of cards is taken into account has been proposed. There are two cases in which a card reading unit is used for such a POS terminal unit. In the first case, an external card reading unit is connected to the POS terminal unit. In the second case, a card reading unit is provided in the POS terminal unit.

In the case where the card reading unit is provided in the POS terminal unit, a slit used to insert a card into the card reading unit has to be formed on the POS terminal unit.

In a case where the POS terminal unit is used in a store, such as a so-called fast-food store dealing with food and drink, there may be the following problem.

In such a store, liquid, such as drink, is frequently dealt with. Particularly, in a fast-food store there may be many cases in which the POS terminal is set on a counter table over which commodities are handed to persons. In such cases, the liquid, such as drink, may enter the POS terminal unit through the slit used for insertion of the cards. The POS terminal unit is provided with electronic devices. Thus, if the liquid enters the POS terminal unit, the liquid may affect the electronic devices.

The liquid may enter the POS terminal unit through not only the slit used for the insertion of the cards but also other seams on the housing of the POS terminal unit. Thus, it is necessary for the POS terminal unit used particularly in such a food dispensing store to prevent the liquid from entering the unit.

SUMMARY OF THE INVENTION

Accordingly, a general object of the present invention is to provide a novel and useful terminal unit in which the disadvantages of the aforementioned prior art are eliminated.

A specific object of the present invention is to provide a terminal unit, such as a POS terminal unit, in which liquid can be prevented from entering the unit, particularly through a slit used for the insertion of cards.

In a case in which the terminal unit has a slit used for an object other than the insertion of the cards, the terminal unit has the same disadvantages. Thus, the present invention may be applied to such a case.

The above objects of the present invention are achieved by a terminal unit having a mechanism processing an information recording card and a slit into which the card is inserted, wherein the slit is provided on a side surface of said terminal unit, and wherein a slit upper portion in an upside of the slit overhangs outward with respect to a slit lower portion at a underside of the slit.

According to the above terminal unit, the structure of the slit upper portion and the slit lower portion prevents liquid from entering the terminal unit through the slit.

The above objects of the present invention are also achieved by a terminal unit having a mechanism processing an information recording card and a slit into which the card is inserted, wherein the slit is provided on a side surface of said terminal unit, wherein a card guide is provided in an innermost portion of the slit, said card guide limiting positions of upper and lower surfaces of the card inserted into the slit and a position of a leading edge of the inserted card, and wherein a pair of projections are formed at an end of said card guide, the projections being projected toward the upper surface and lower surface of the card inserted into the slit.

According to the above terminal unit, even if the liquid enters the end portion of the card guide, the projection portions prevent the liquid from entering the middle portion of the slit.

Further, the above objects of the present invention are achieved by a terminal unit having a mechanism for processing an information recording card and a slit into which the card is inserted, wherein the slit is provided on a side surface of said terminal unit, wherein an upper surface connected to said side surface is inclined so as to be gradually lowered toward a boundary between said side surface and said upper surface, and wherein a projection is formed near the boundary on said upper portion, said projection being extended in a direction parallel to a longitudinal direction of the slit.

According to the above terminal unit, the projection stops the liquid flowing along the upper surface toward the side surface. Thus, the liquid is prevented from entering the terminal unit through the slit formed on the side surface.

The above objects of the present invention are also achieved by a terminal unit comprising: a cover body; a supporting member formed on said cover body, said supporting member having ring-shaped end surfaces; and a mounting member fit on said supporting member the ring-shaped end surfaces being held between parts of said supporting member, wherein a fitting gap between said supporting member and said mounting member is set at a value so that a liquid droplet is supported by a surface tension between said supporting member and said mounting member.

According to the above terminal unit, even if a liquid droplet is on the fitting gap between the supporting member and the mounting member, the liquid droplet is supported by the surface tension between the supporting member and the mounting member so as to be prevented from entering the cover body through the fitting gap.

BRIEF DESCRIPTION OF THE DRAWINGS

Other objects, features and advantages of the present invention will be apparent from the following description when read in conjunction with the accompanying drawings, in which:

FIG. 7A is a front view of a card rail;

FIG. 7B is a cross sectional view of the card rail taken along line 7B—7B of FIG. 7A;

DESCRIPTION OF THE PREFERRED EMBODIMENTS

A description will be given of embodiments of the present invention with reference to the drawings.

Side, top, front and rear views of a POS terminal unit according to an embodiment of the present invention are shown in FIGS. 1 to FIG. 4.

Figure 1:
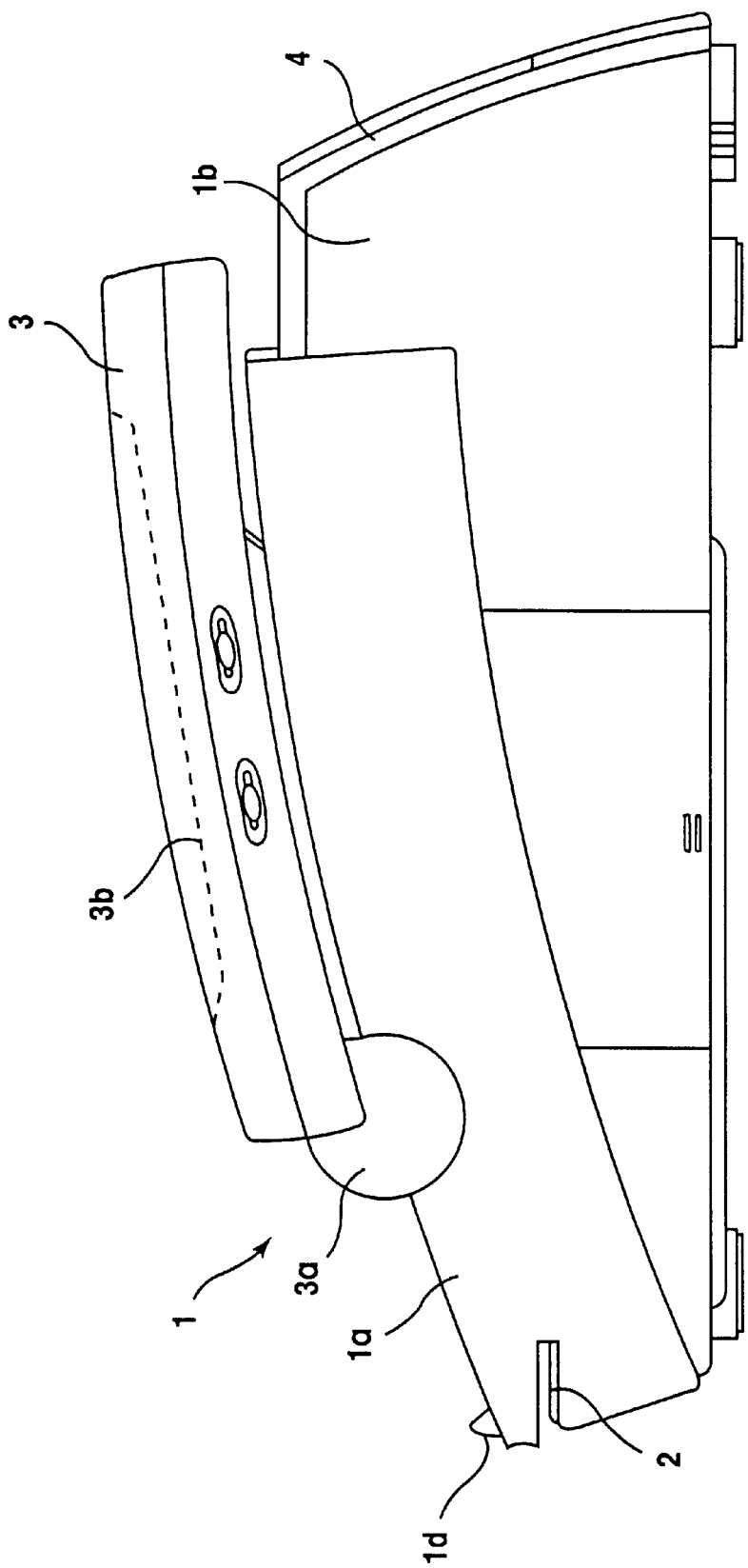
FIG. 1 is a side view of a POS terminal unit according to an embodiment of the present invention.

In FIGS. 1–4, a POS terminal 1 is shown. The POS terminal 1 is used, particularly, in a fast-food store. Such a POS terminal unit is installed on a counter table which is located between store clerks and customers facing each other. Referring to FIG. 1, on the left side, a store clerk is positioned and on the right side, a customer is positioned. The store clerk operates the POS terminal unit to register commodities bought by the customer and to calculate the transaction sum.

The POS terminal unit 1 is formed of an upper base cover 1a and a base portion 1b. Each of the upper base cover 1a and the base portion 1b is monolithically made of resin. Particularly to prevent liquid from entering the inside of the POS terminal unit 1, it is important to monolithically make the upper cover 1a so that there are no seams.

Figure 3:
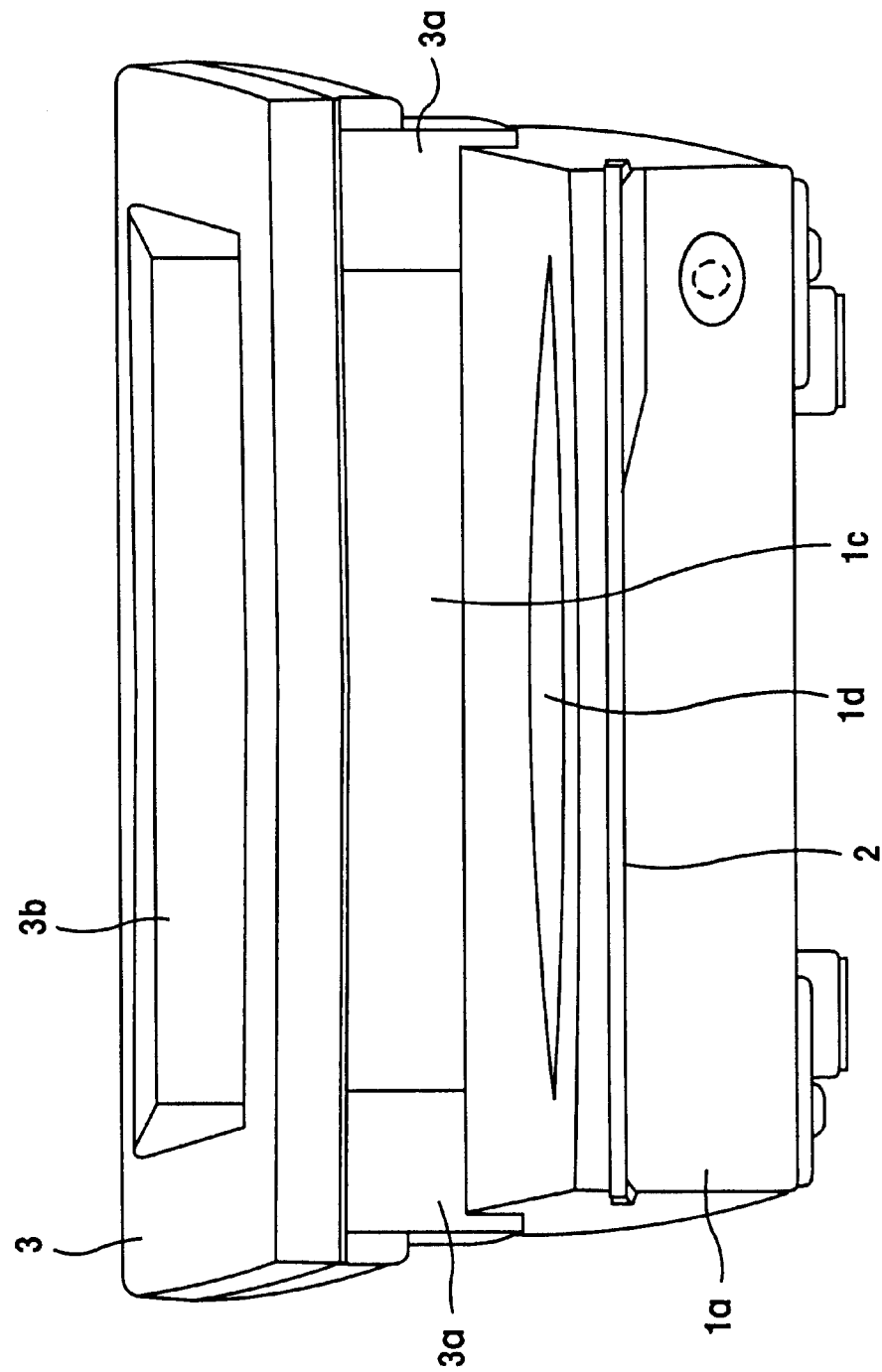
FIG. 3 is a front view of the POS terminal unit.

On the upper cover 1a at a front side of the POS terminal unit 1, a slit 2 through which cards, such as credit cards, are passed is formed. As shown in FIG. 1, the slit 2 is formed so as to be substantially parallel to a surface on which the POS terminal 1 is installed. In addition, as shown in FIG. 3, the slit 2 extends so as to completely cross the width of the front surface of the POS terminal unit 1 in a horizontal direction. The slit 2 may be inclined so as to be lowered left in FIG. 1 (so that the opening of the slit 2 is lowered). However, an operation for passing a card through the slit 2 formed in parallel to the surface on which the POS terminal unit 1 is installed is easier than an operation for passing a card in the inclined slit 2.

A card reading apparatus (not shown) is mounted in the POS terminal unit 1 at a position corresponding to the slit 2. The card reading apparatus means not only an apparatus only reading information recorded in a card but also an apparatus capable of reading or recording information from or in a card. Thus, hereinafter, even if an apparatus is for recording information in a card, the card is referred to as the card reading apparatus.

A display panel 3 is mounted on the upper cover 1a. The display panel 3 is supported by a supporting member 3a so as to be capable of being pivoted on the supporting member 3a. FIG. 1 shows a state in which the display panel 3 lies down at its lowest position. The display panel 3 is pivoted in a counterclockwise direction and can be set at a desired angle and height.

Figure 2:
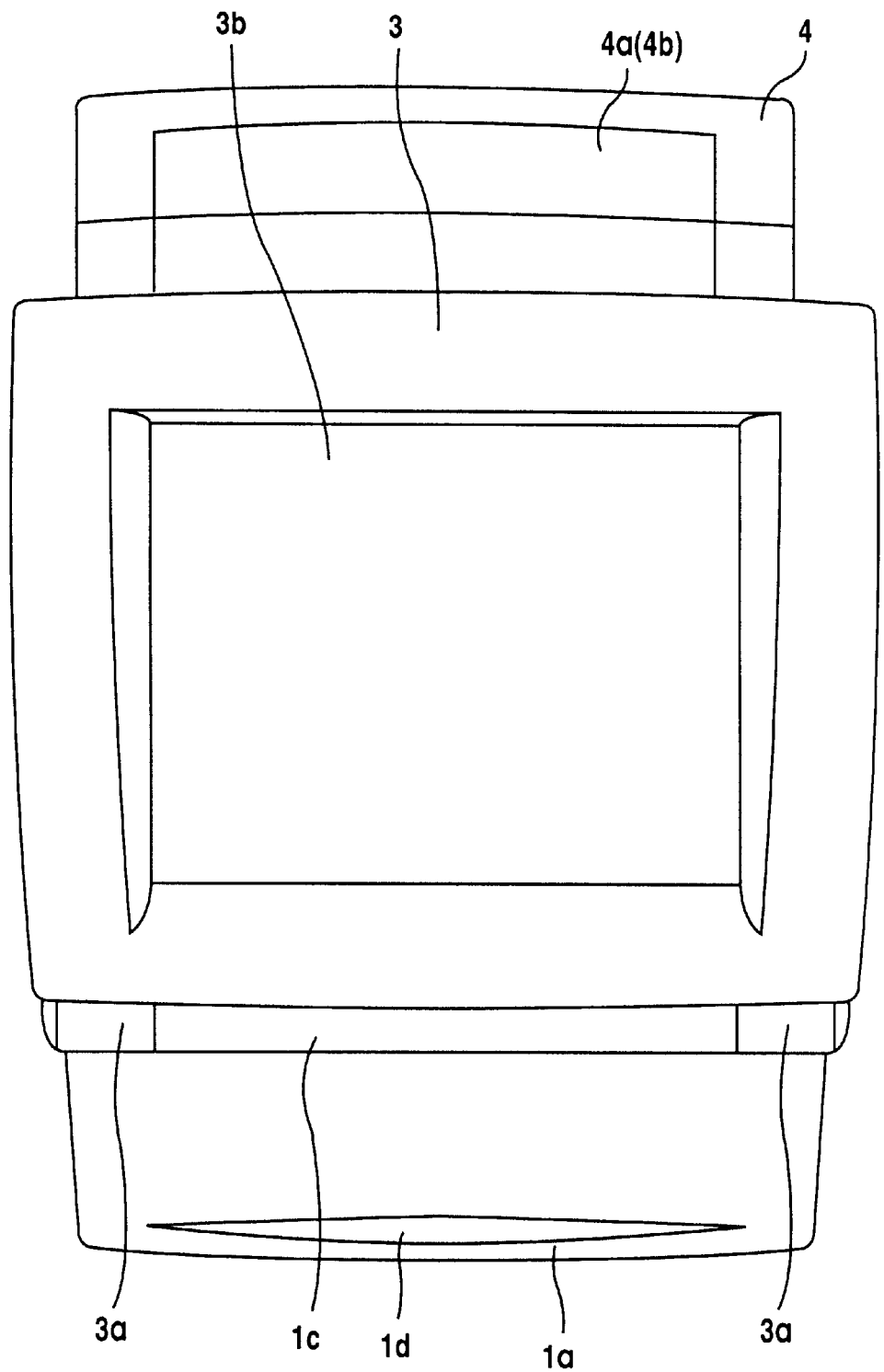
FIG. 2 is a top view of the POS terminal unit.

As shown in FIG. 2, the display panel 3 is provided with a screen 3b on which images are displayed. Various types of information needed for transactions to customers and information needed for the store are displayed on the screen 3b. The screen 3b functions as the so-called touch panel. An operator touches various buttons on the screen 3b so that name and price of a commodity ordered by a customer is displayed and the subtotal sum is calculated.

As shown in FIG. 3, the supporting member 3a of the display panel 3 is fit on the a supporting member 1c formed on the upper cover 1a so that the display panel 3 and the upper cover 1a are connected. In practice, the supporting member 1c is substantially cylindrically shaped so as to have openings and the supporting member 3a is a cylinder, having openings, corresponding to the supporting member 1c. Since the touch panel of the display panel 3 is operated by the operator, the display panel 3 should be fixed at a predetermined angle. Although the POS terminal unit in this embodiment has no mechanism fixing the display panel 3 at a predetermined angle, the display panel 3 is fixed at an angle by a force of fitting the supporting member 3a on the supporting member 1c. An edge of each of the openings of the supporting member 1c is cone-shaped so as to be expanded outward. Due to this shape of the supporting member 1c, liquid is prevented from entering the inside of the terminal unit through contact surfaces of the supporting members 1c and 3a. That is, the liquid between the contact surfaces of the supporting members 1c and 3a is guided by the cone-shaped edge of each of the openings of the supporting member 1c outside of the POS terminal unit 1, so that it is difficult for the liquid to enter the POS terminal unit 1.

In addition, as shown in FIGS. 1–3, a projection portion 1d is formed on an upper surface of the upper cover 1a near a boundary between the upper surface of the upper cover 1a and a side surface on which the slit 2 is formed. The projection portion 1d is extended in the longitudinal direction of the slit 2. Water droplets going along the upper surface of the upper cover 1a are stopped and guided to the sides of the upper cover 1a. As a result, the water droplets going along the upper surface of the upper cover 1a can be prevented from entering the terminal unit through the slit 2 formed on the side surface continuous with the upper surface.

Figure 4:
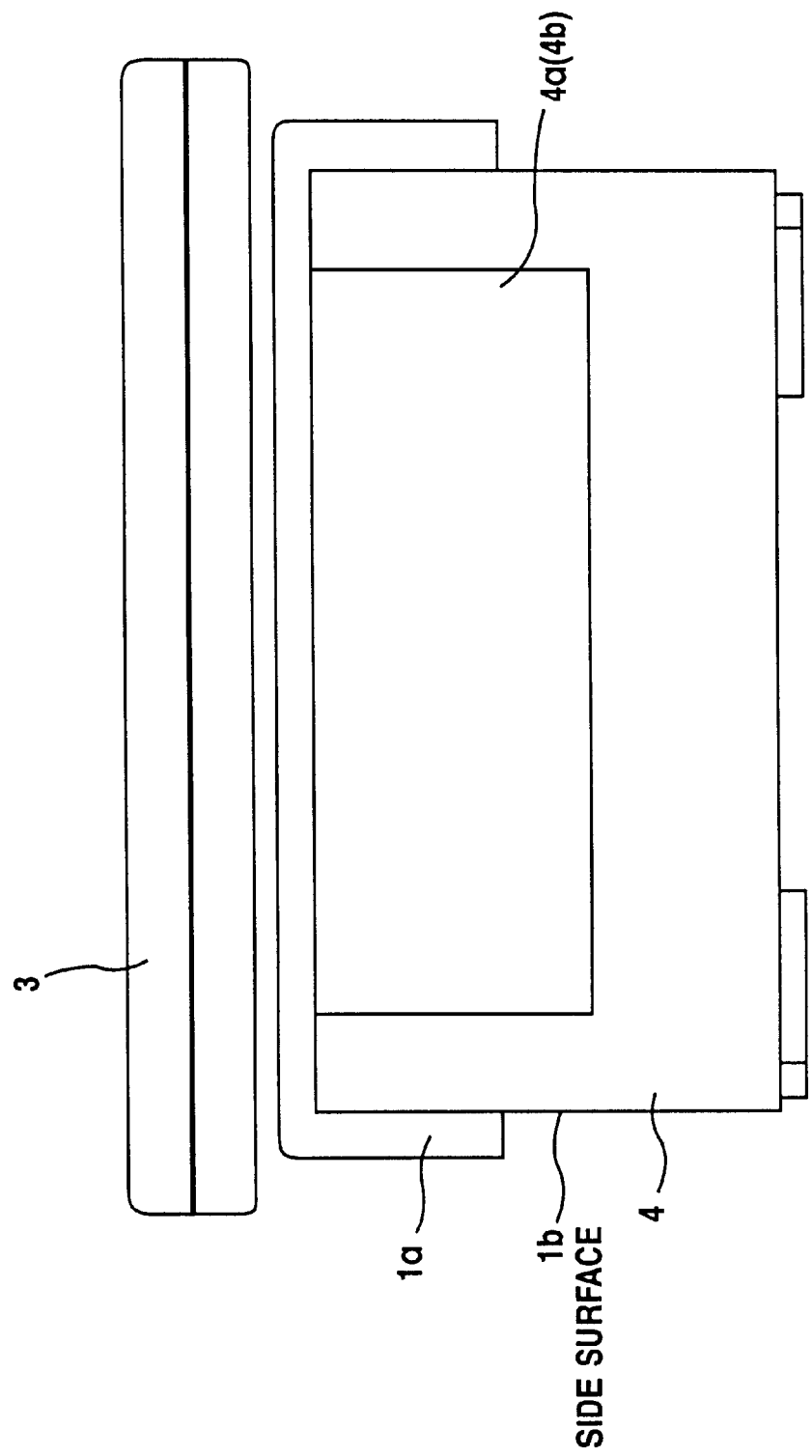
FIG. 4 is a rear view of the POS terminal unit.

On the rear side of the POS terminal unit 1, a back cover 4 is mounted. As shown in FIG. 4, a window 4a is formed on the back cover 4. A display unit (not shown) is provided behind the window 4a. The display unit is used for customers to display names and prices of commodities, the total sum and the like. The customers can look at the items displayed on the display unit through the window 4a. A cover 4b made of transparent resin is attached to the window 4a so that the liquid is prevented from enter the terminal unit through the window 4a. The back cover 4 is fit on the base potion 1b and the upper cover 1a. The detailed description will be given later.

Figure 5:
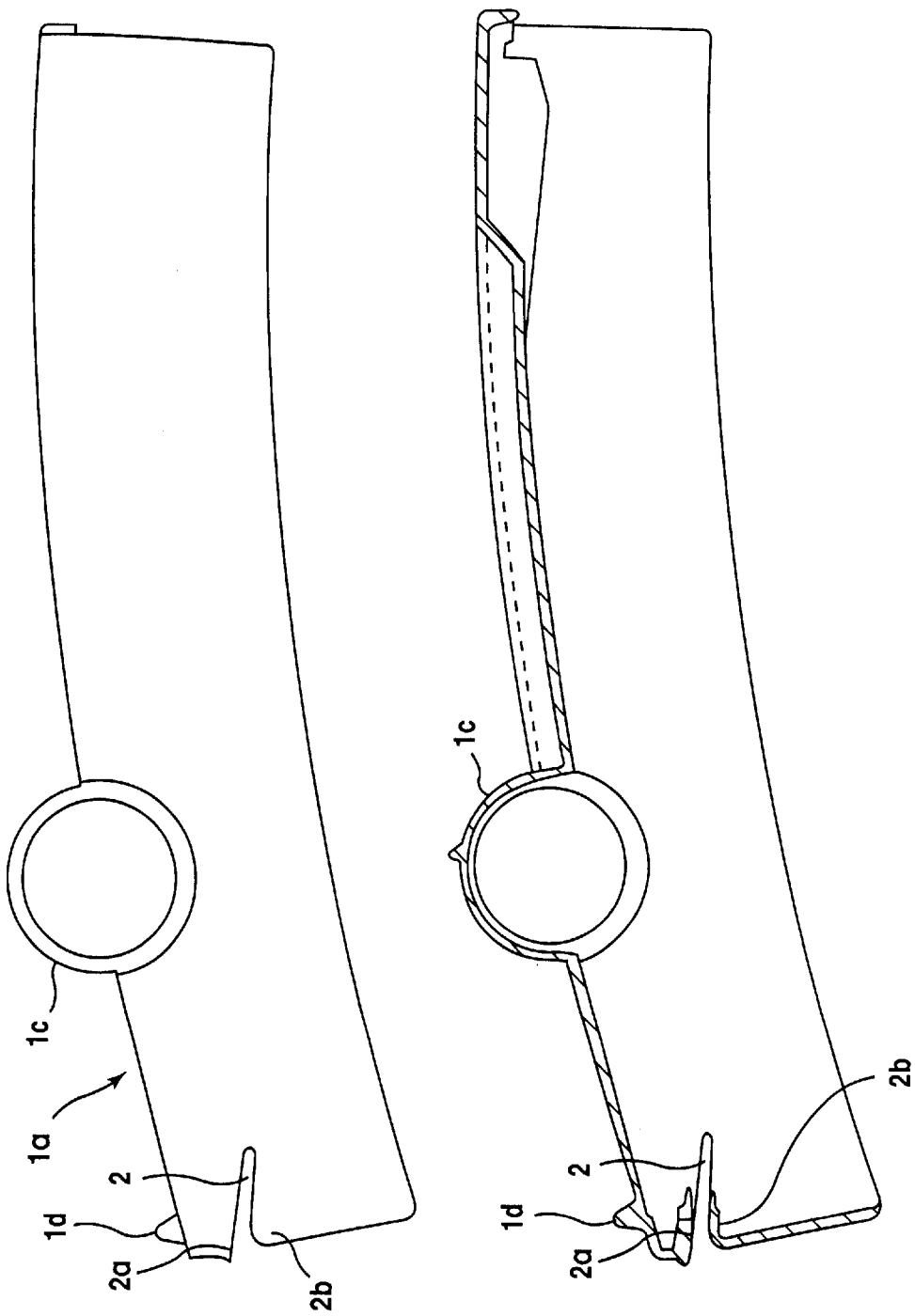
FIG. 5A is a side view of an upper cover.
FIG. 5B is a cross sectional view of the upper cover.

FIG. 5A shows a side view of the upper cover 1a and FIG. 5B shows a cross sectional view of the upper cover 1a near the center. Hereinafter, if it is not necessary to distinguish FIG. 5a and FIG. 5b, FIG. 5 is used for convenience as the general term of FIGS. 5a and 5b.

Figure 6:
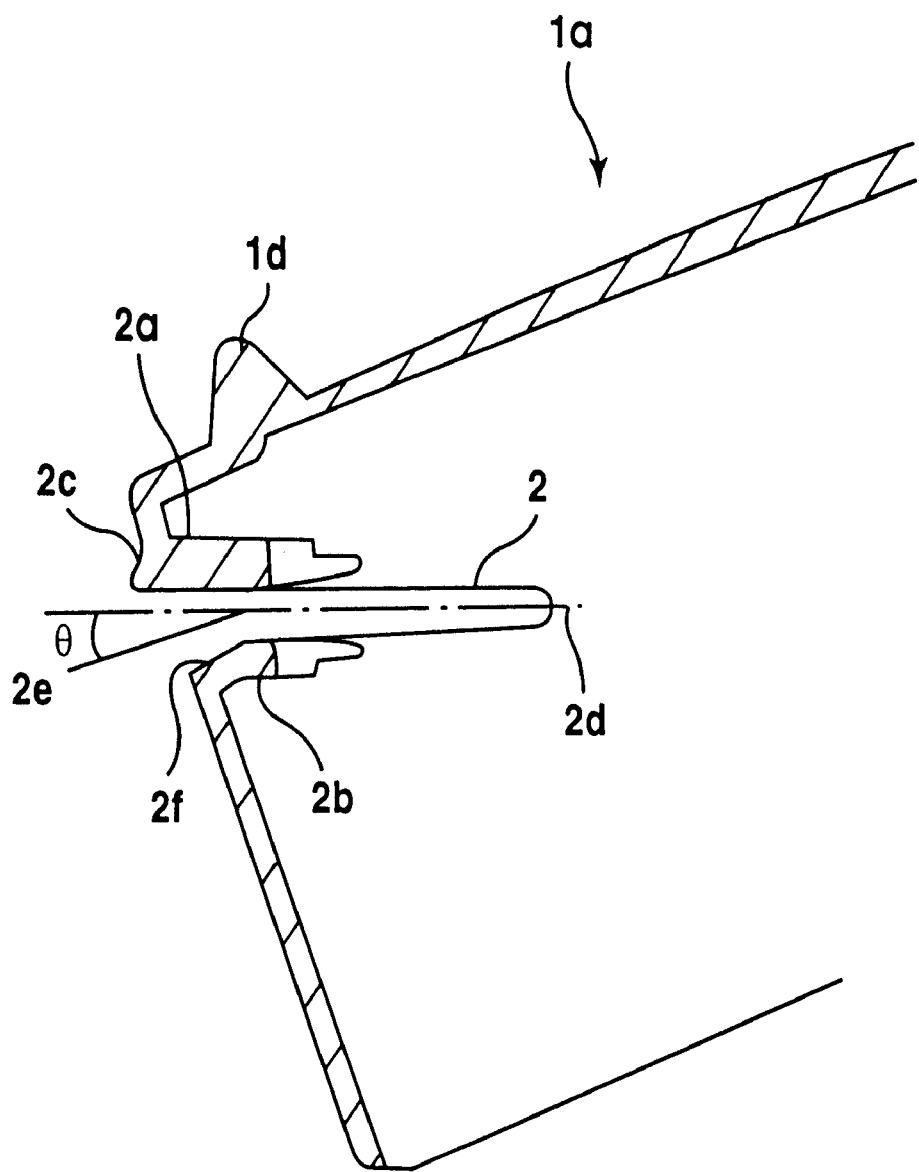
FIG. 6 is an enlarged side cross sectional view of a slit portion.

The slit 2 is formed on the left side in FIG. 5. FIG. 6 shows an enlarged slit portion. In FIG. 6, a chain line 2d shows an extension line in a depth direction of the slit 2. The extension line is substantially parallel to the surface on which the POS terminal unit 1 is installed. A solid line 2e drawn from the chain line 2d is perpendicular to a front wall of the upper cover 1a.

Comparing the chain line 2d and the solid line 2e shown in FIG. 6, the solid line 2e is inclined with respect to the chain line 2d at 10 degrees. Since the slit 2 is formed so as to be substantially parallel to the surface on which the POS terminal unit 1 is installed, the front wall of the upper cover 1a is inclined with respect to a line perpendicular to the surface on which the POS terminal unit 1 is installed (perpendicular to the chain line 2e) so as to overhang. That is, an upper portion 2c in the upside of the slit 2 overhangs with respect to the lower portion 2b in the underside of the slit 2.

Due to the structure of the slit 2, the liquid that flows on the upper surface of the terminal unit can be prevented from entering the terminal unit through the slit 2. The liquid flows downward. Since the upper portion 2d overhangs with respect to the lower portion 2b, the liquid is going to fall along the wall. In addition, since the slit 2 is formed in the substantially horizontal direction, it is difficult for the liquid to enter the terminal unit through the slit 2.

Further, a projection 2c is formed on the surface of the upper portion 2a on the upside of the slit 2. The projection 2c extends approximately the whole width of the upper portion 2a. The projection 2c functions as a gutter. The liquid flowing from the upper surface of the terminal unit is guides toward the sides by the projection 2c. The card reading apparatus is located in approximately the middle of the slit 2. Due to the projection 2c, it is difficult for the liquid to enter the slit 2 at a position at which the card reading apparatus is set.

In addition, the edge of the lower portion 2b is chamfered so that a chamfer portion 2f is formed as shown in FIG. 6. Thus, even if the liquid droplets fall down from the upper portion 2c and slightly enter the slit 2, the liquid can be guided to the front surface of the terminal unit along the chamfer portion 2f. The liquid does not enter the innermost portion of the slit 2 and is drained outward.

As has been described above, due to contriving the structure of the slit 2, the liquid can be prevented from entering the POS terminal unit through the slit 2.

Figure 8A:
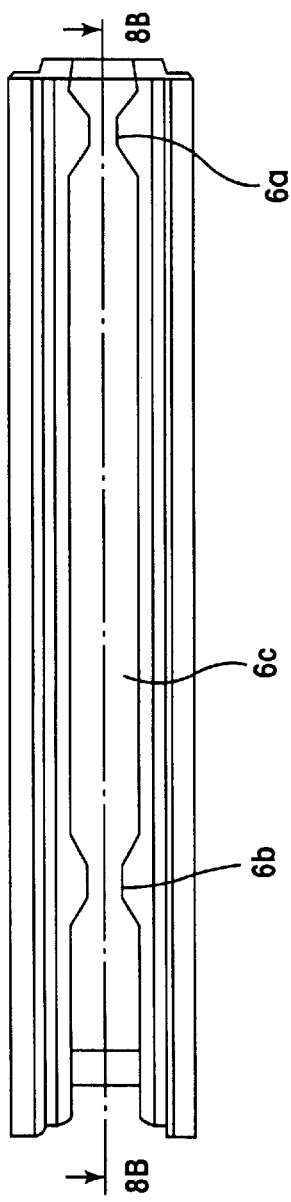
FIG. 8A is a front view of a card rail.
Figure 8B:
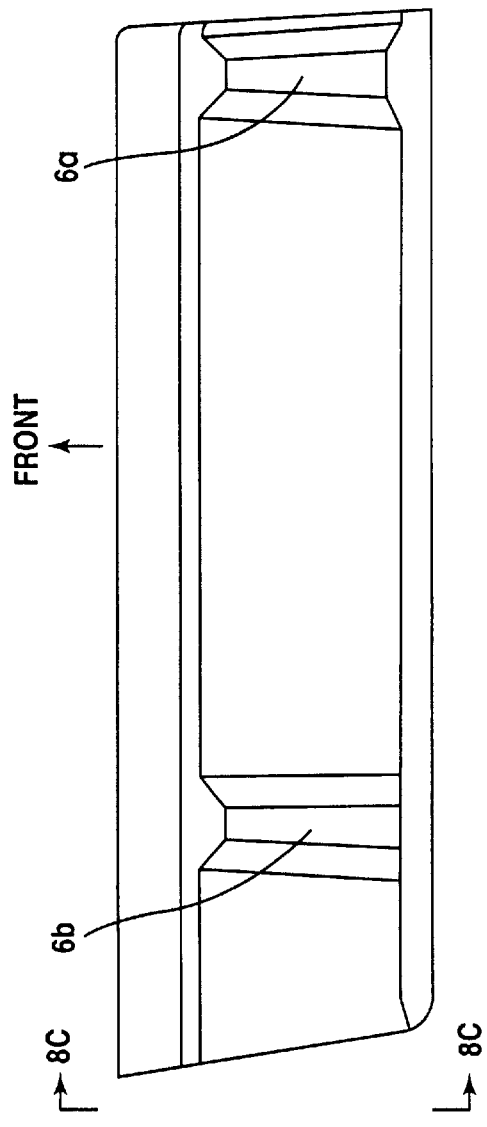
FIG. 8B is a cross sectional view of the card rail taken along line 8B—8B of FIG. 8A.
Figure 8C:
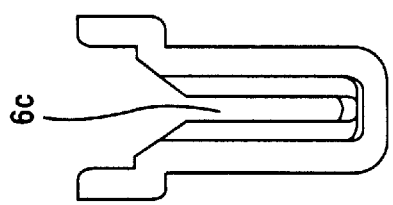
FIG. 8C is a side cross sectional view of the card rail taken along line 8C—8C of FIG. 8B.

FIGS. 7A–8C show card rails 5 and 6 which are provided in the inner portion of the slit 2 to guide cards. FIG. 7A shows a front view of the card rail 5. FIG. 7B shows a cross sectional view taken along line A—A shown in FIG. 7A. FIG. 8A shows a front view of the card rail 6. FIG. 8B shows a cross sectional view taken along line A—A shown in FIG. 8A. FIG. 8C shows a side cross sectional view of the card rail 6. The card rail 5 shown in FIGS. 7A and 7B is provided in a side of the POS terminal unit 1 (the left side in FIGS. 7A and 7B) and the card rail 6 shown in FIGS. 8A, 8B and 8C is provided in another side of the POS terminal unit 1 (the right side in FIGS. 8A,and 8B). The card reading apparatus is mounted between the card rails 5 and 6 as shown in FIGS. 7A–8C.

The card rails 5 and 6 described above are provided in the inner side of the upper cover 1a of the POS terminal unit 1. To enable the card reading apparatus to read a card, the card is caused to pass through the slit 2. First, the card is inserted in the slit 2 until the card is bumped against the rear wall of the card rail 5 or 6. The card is then moved toward the card reading apparatus. Due to the card rails 5 and 6, the card can be certainly guided to the card reading apparatus.

In FIGS. 7A and 7B, a pair of projections 5a are formed on upper and lower surfaces of a slit portion 5b of the card rail 5 so as to face each other. The pair of projections 5a are located near an end of the card rail 5. The pair of projections 5a prevents the liquid from entering the middle portion of the slit 2 through the end portion of the card rail 5. That is, even if the liquid enters the end portion of the card rail 5, the liquid cannot go over the projections 5a, so that the liquid does not reach an area in which the card reading apparatus is provided.

In the embodiment shown in FIGS. 8A–8C, a pair of projections 6a are formed, near an end of the card rail 6, on upper and lower surfaces of a slit portion 6c of the card rail 6 in the same manner as in the case shown in FIGS. 7A–7B. In the case of the card rail 6, further, a pair of other projections 6b are formed near another end of the card rail 6 (near the middle of the slit 2 of the upper cover 1a). The projections 6a and 6b have the same function as the projections 5a formed on the card rail 5.

Figure 9:
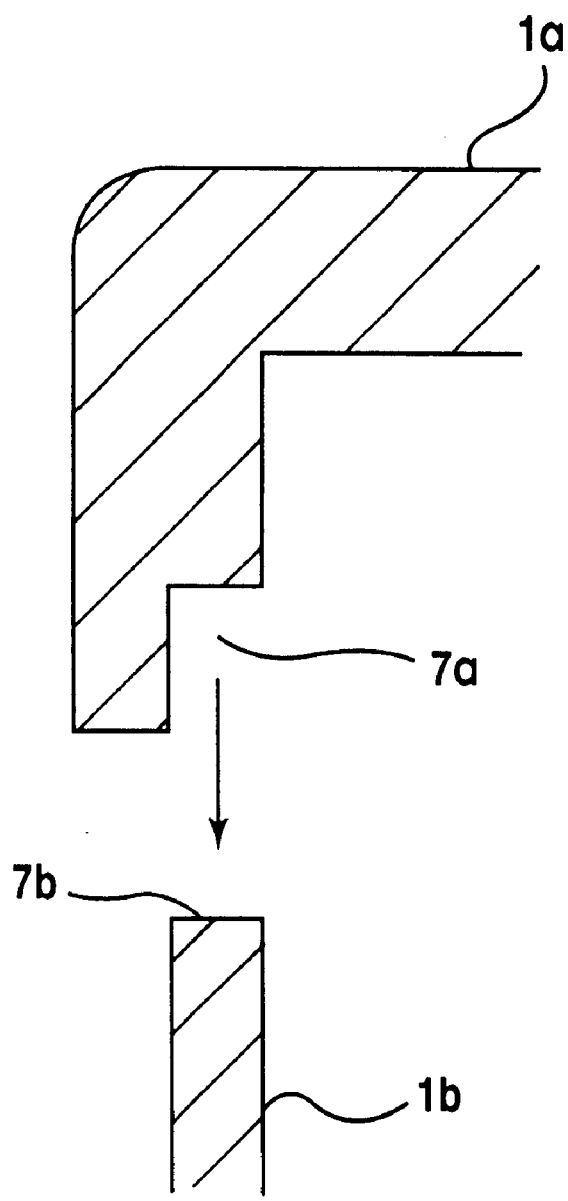
FIG. 9 is a diagram illustrating an engagement between the upper cover and a base portion.

The upper cover 1a and the base portion 1b are integrated with each other so that the upper cover 1a is located on the outside of the base portion 1b as shown in FIG. 4. FIG. 9 shows an enlarged essential part in which the upper cover 1a and the base portion 1b are connected. As shown in FIG. 9, a step portion 7a is formed on an end surface of the upper cover 1a. To integrate the upper cover 1a and the base portion 1b with each other, the step portion 7a is set on the upper end surface 7b of the base portion 1b. Thus, the upper end of the base portion 1b is located in the upper case 1a.

Due to the connection between the upper case 1a and the base portion 1b, as described above, the liquid flowing along the upper surface of the upper cover 1a can be prevented from entering the inside of the terminal unit through a space between connection surfaces of the upper cover 1a and the base portion 1b. In addition, if packing, such as rubber, is sandwiched by the connection surfaces of the upper cover 1a and the base portion 1b, a waterproof effect of the POS terminal unit can be further improved.

The back cover 4 is integrated with the base portion 1b and the upper cover 1a in the same manner as in the case of integrating the upper cover 1a and the base portion 1b.

Figure 10:
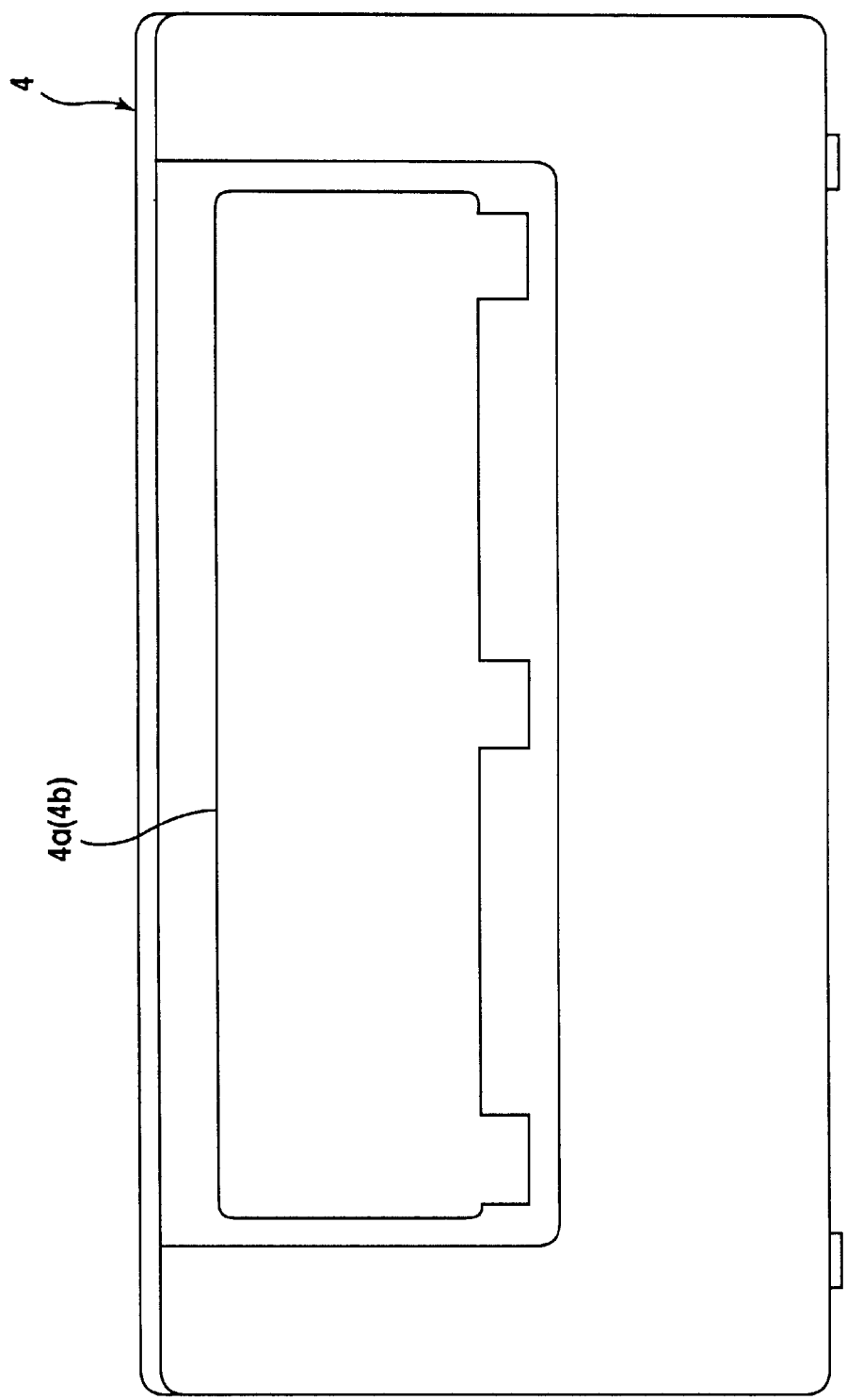
FIG. 10 is a front view of a back cover.
Figure 11:
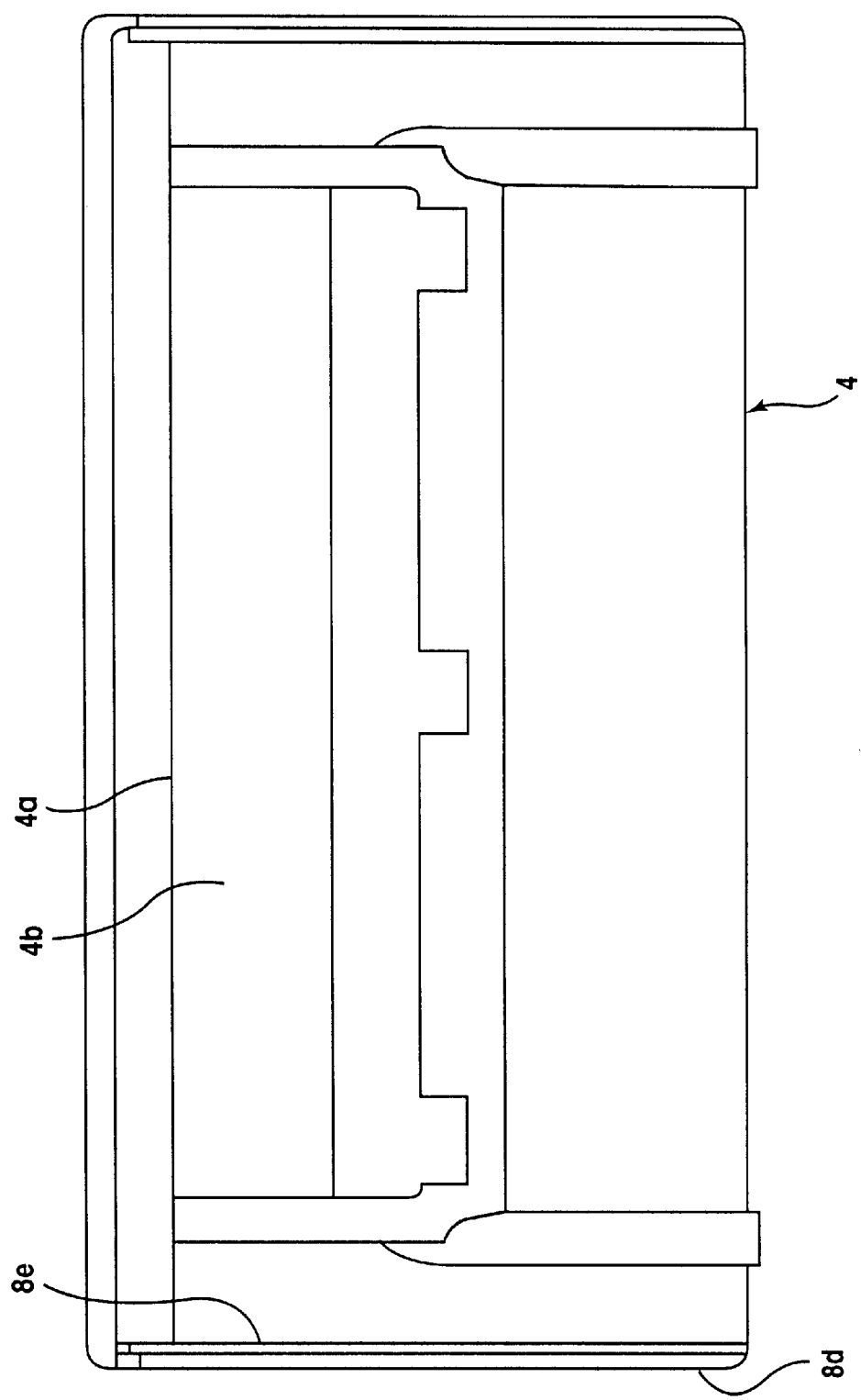
FIG. 11 is a diagram illustrating a rear side of the back cover.
Figure 12:
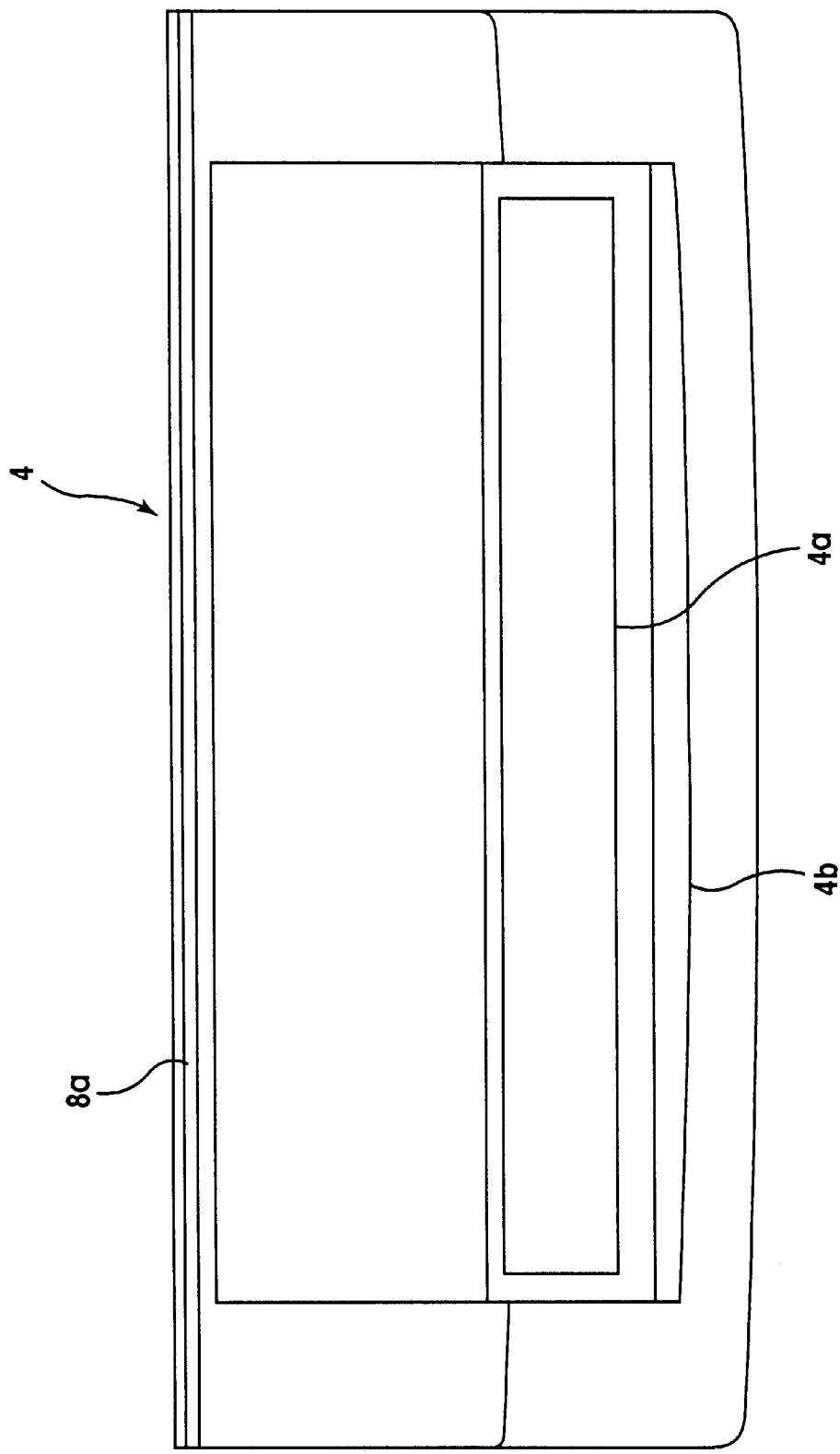
FIG. 12 is a top view of the back cover.
Figure 13:
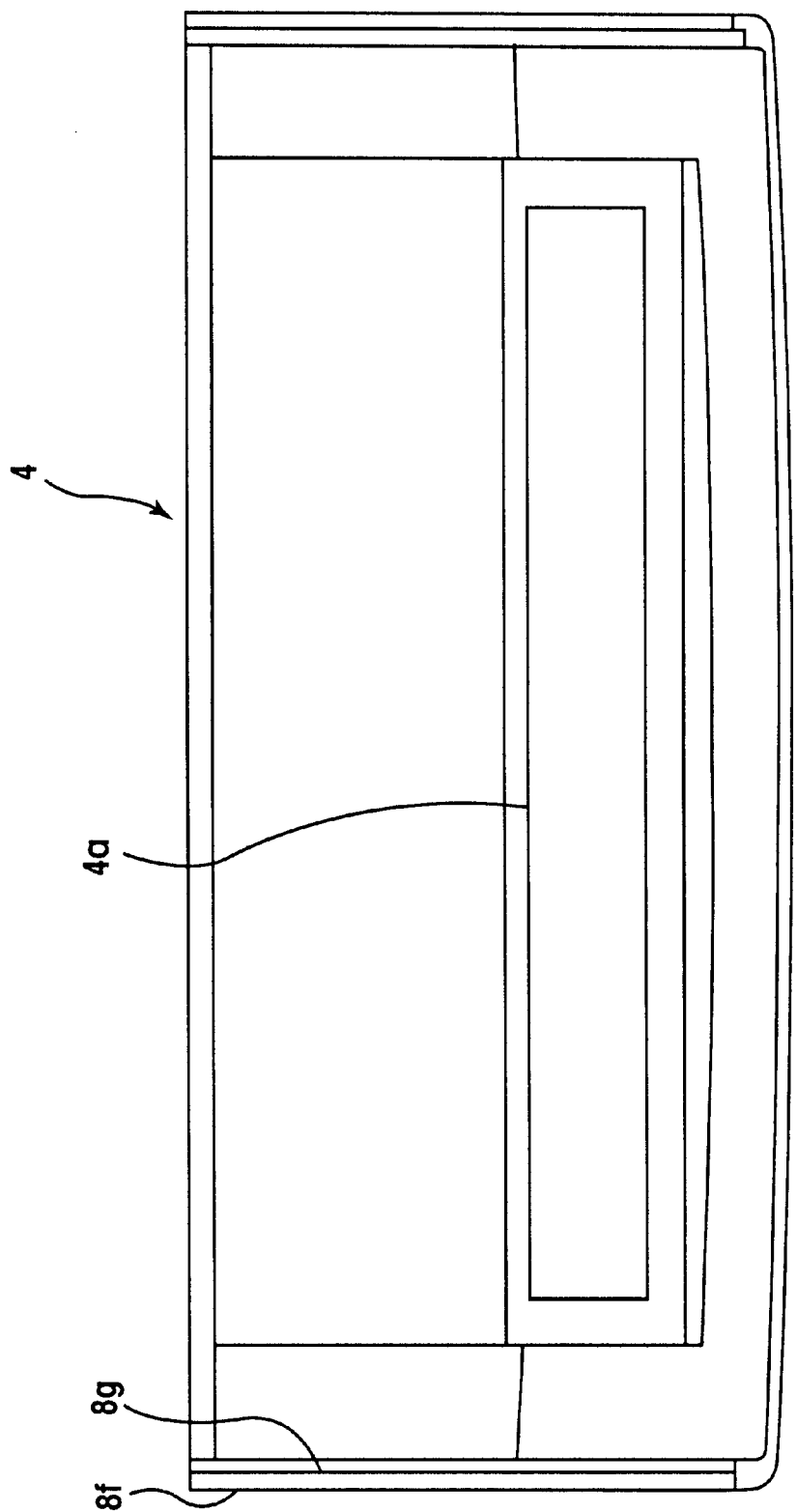
FIG. 13 is a bottom view of the back cover.
Figure 14:
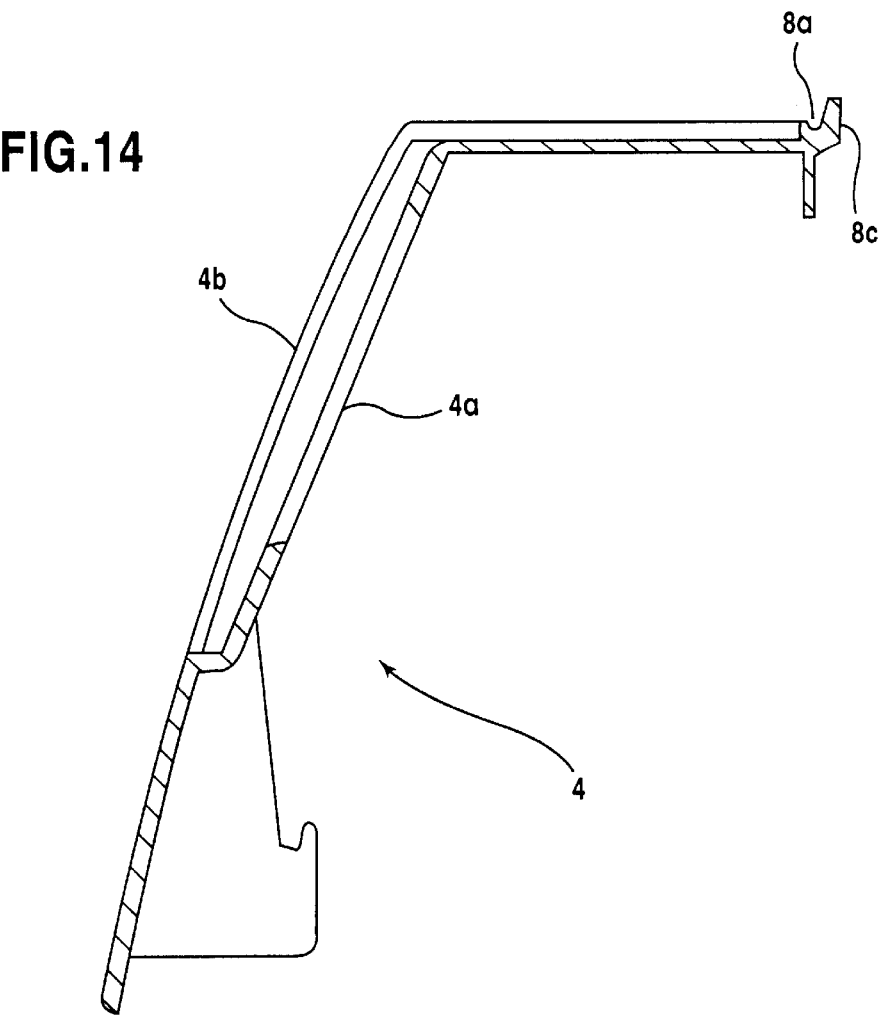
FIG. 14 is a side cross sectional view of the back cover.

FIGS. 10–14 show the back cover. FIG. 10 shows a front view of the back cover 4 and FIG. 11 shows a rear view of the back cover 4. FIG. 12 shows a top view o the back cover 4. FIG. 13 shows a bottom view of the back cover 4. Further, FIG. 14 shows a cross sectional view taken along approximately the center line of the back cover 4.

The window 4a to which the window cover 4b is attached is formed on the back cover 4 as described above.

As shown in FIG. 14, at an upper end of the back cover 4, a groove 8a is formed. The groove 8a is extended the whole width of the back cover 4 as shown in FIG. 12.

Figure 15:
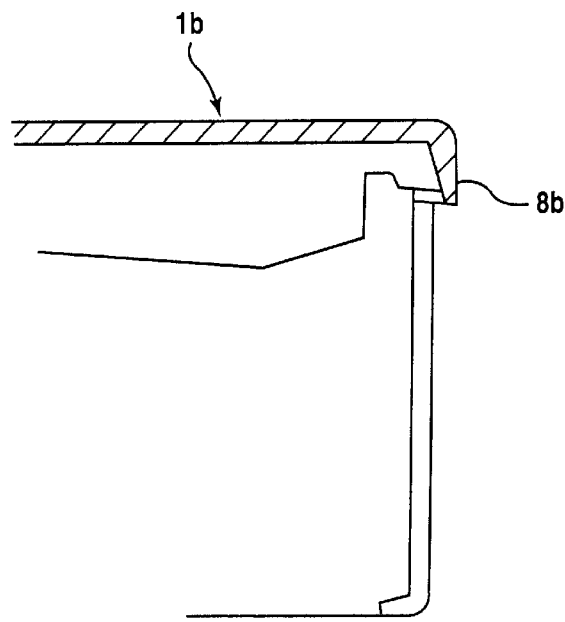
FIG. 15 is a side cross sectional view of a rear end of the upper cover.
Figure 16:
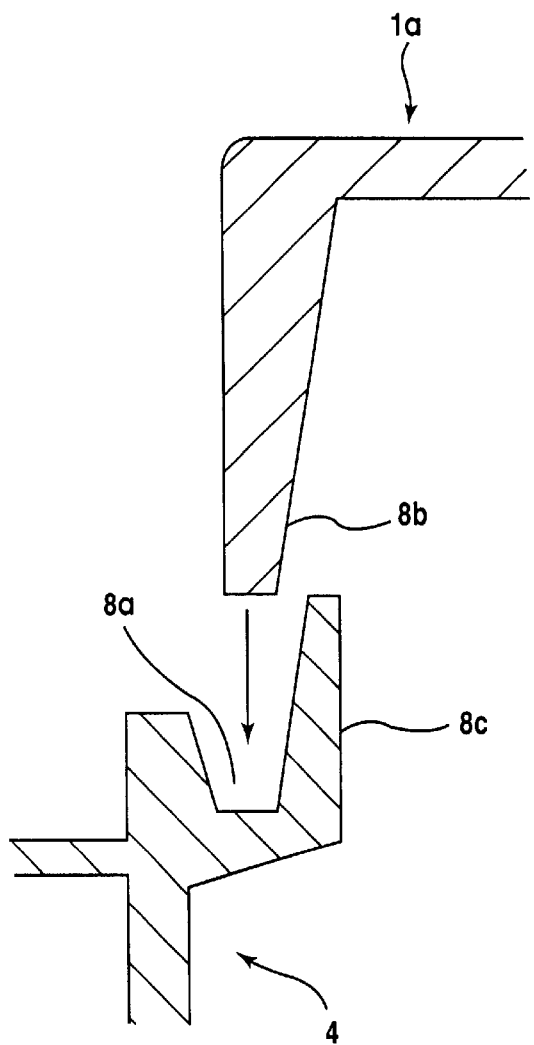
FIG. 16 is a diagram illustrating an engagement between the rear end of the upper cover and the back cover.

FIG. 15 shows an enlarged essential part of a rear end portion of the upper cover 1a. At the rear end portion of the upper cover 1a, a hook-shaped projection 8b is formed. When the back cover 4 and the upper cover 1a are integrated with each other, the projection 8b is fit in the groove 8a of the back cover 4. A state where the projection 8b is fit in the groove 8a is shown in FIG. 16. The upper cover 1a is lowered in a direction indicated by an arrow shown in FIG. 16, and the upper cover 1a is then fit in on the back cover 4.

The groove 8a formed on the back cover 4 functions as a gutter. The liquid reaching a connecting portion between the upper cover 1a and the back cover 4 is guided leftward and rightward by the groove 8a. In addition, the groove 8a has a wall 8c. If the liquid flows into the groove 8a, the liquid cannot go over the wall 8c. As a result, the liquid can be prevented from entering the POS terminal unit.

The liquid guided to the sides of the back cover 4 by the groove 8a flows downward. In this case, it is necessary to prevent the liquid from entering the POS terminal unit through a space between connection surfaces of the back cover 4 and the base portion 1b.

Figure 17:
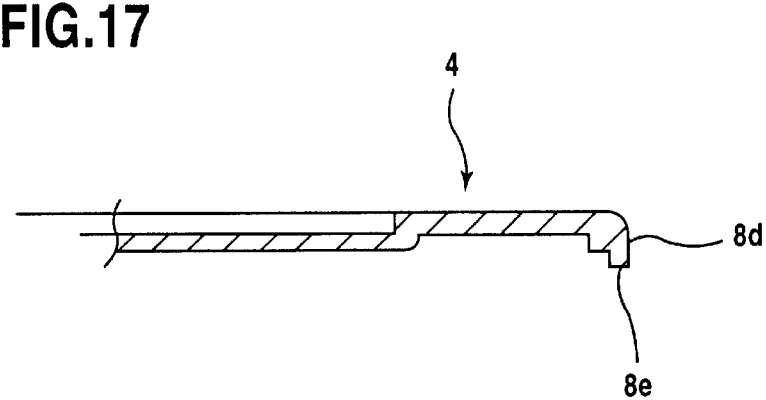
FIG. 17 is an enlarged cross sectional view of a rear end of the back cover.

The rear view of the back cover 4 is shown in FIG. 11 as described above. A step 8e is formed on a side end 8d of the back cover 4. The step 8e is enlarged as shown in FIG. 17. The step 8e is fit on the side wall of the base portion 1b in the same manner as in the case shown in FIG. 9. The bottom view of the back cover 4 is shown in FIG. 13. A step 8g is formed on a end surface 8f of the back cover 4 and set on the upper surface of the base portion 1b.

Due to the above structure, the liquid is prevented from entering the POS terminal unit through a space between the connection surfaces of the base portion 1b and the back cover 4.

Figure 18:
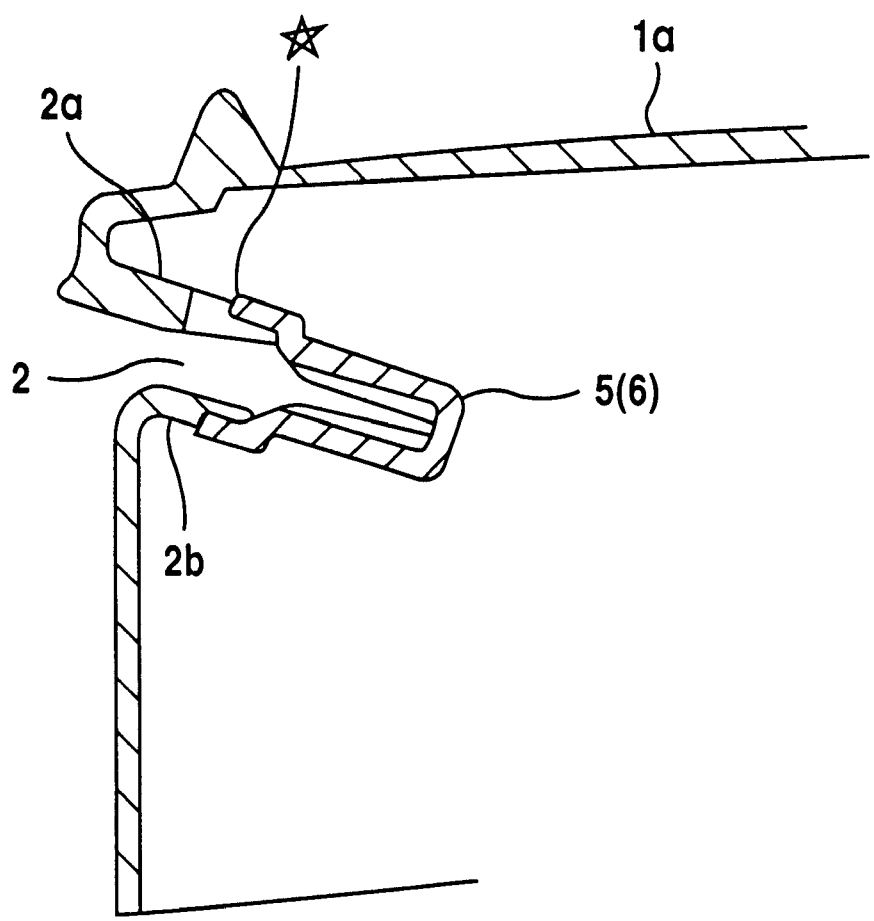
FIG. 18 is a diagram illustrating a structure in which the card rail is attached to the upper cover.

FIG. 18 shows a cross sectional view of a set in which the card rail 5 (or 6) is attached to the upper cover 1a. A star mark in FIG. 18 indicates a stopper surface on which the card rail 5 (or 6) and the slit 2 abut against each other.

Figure 19:
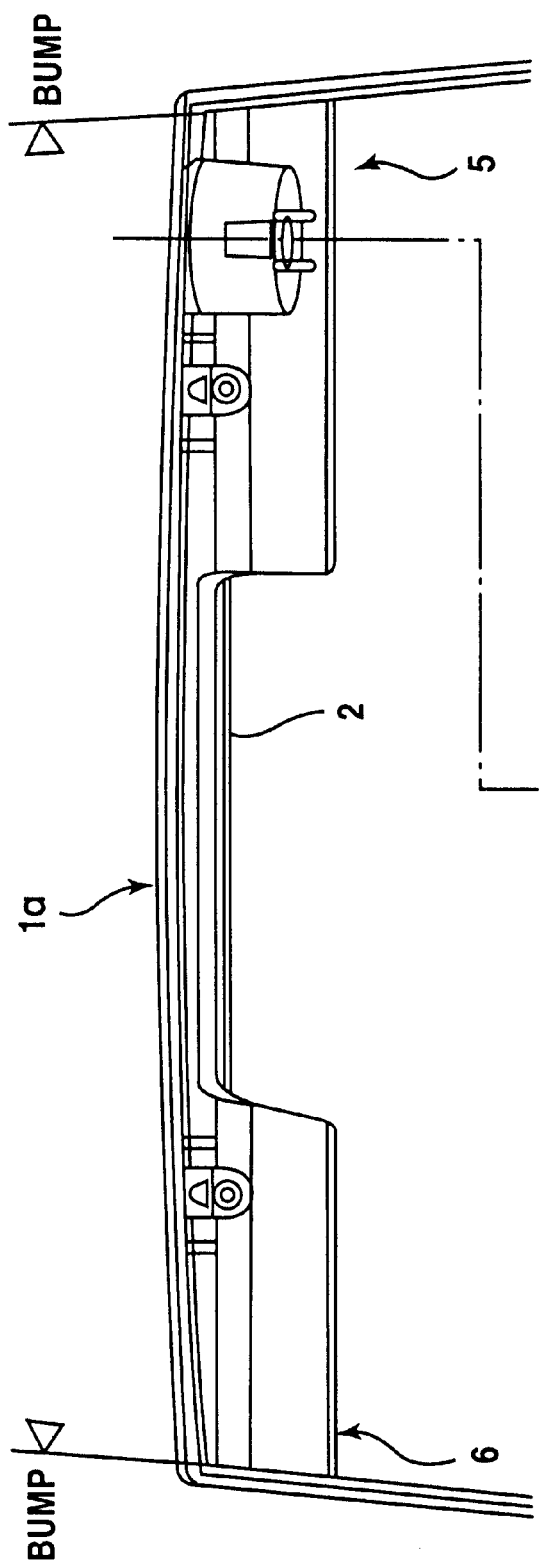
FIG. 19 is a diagram illustrating a structure in which card rails are attached to the upper cover.

In addition, FIG. 19 shows the inside of the upper cover to which the card rails 5 and 6 are attached. As shown in FIG. 19, the card rails 5 and 6 are respectively attached to both sides of the upper cover 1a. The card reading apparatus (not shown) is set between the card rails 5 and 6.

A description will now be given of a detailed structure of the engagement between the supporting member 1c of the upper cover 1a and the supporting member 3a (a mounting member) of the display panel 3.

Figure 20:
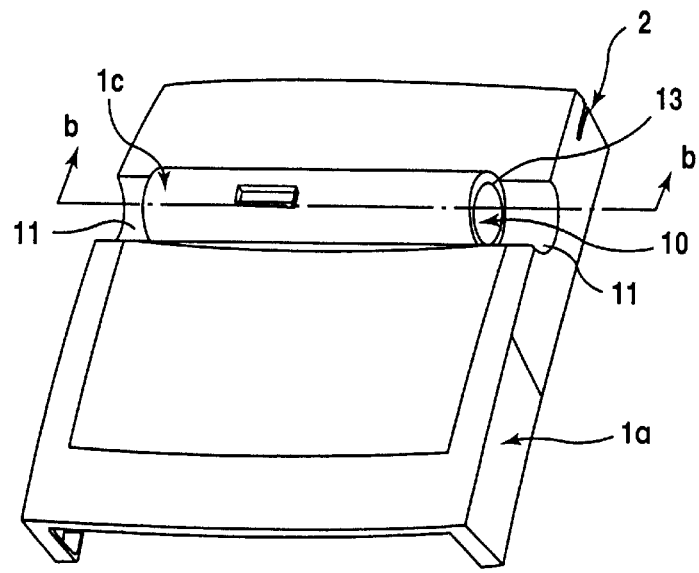
FIG. 20 is an outside view of the upper cover.
Figure 21:
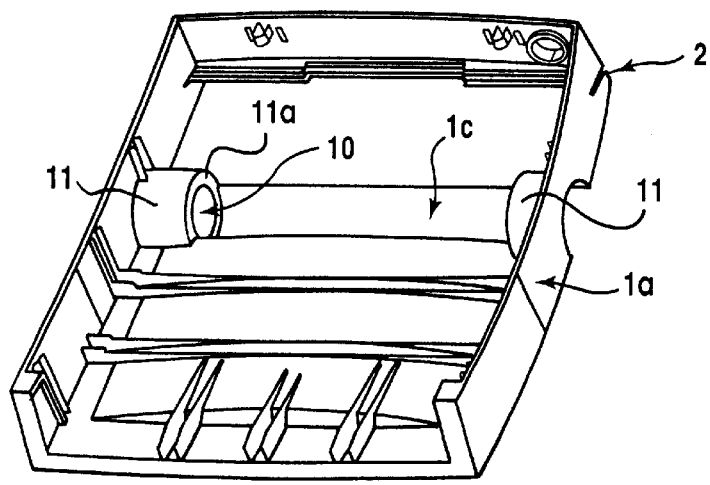
FIG. 21 is a diagram illustrating a rear side of the upper cover.

The upper cover 1a has a structure as shown in FIGS. 20 and 21. FIG. 20 shows an exterior structure of the upper cover 1a and FIG. 21 shows an inner structure of the upper cover 1a.

Referring to FIGS. 20 and 21, the supporting member 1c is formed on the upper surface of the upper cover 1a. The supporting member 1c is extended in a direction substantially parallel to a direction in which the slit 2 is extended. At both sides of the supporting member 1c, holder portions 11, each of which has a circularly curved surface are formed. The supporting member 1c has a structure having a predetermined thickness and curved in a direction opposite to a curving direction of the circularly curved surface of each of the holder portions 11. Each of end portions 13 of the supporting member 1c and an end portion 11a of one of the holder portions 11 are continuously connected to each other, so that a ring-shaped end surface is formed at each end of the supporting member 1c.

Figure 22:
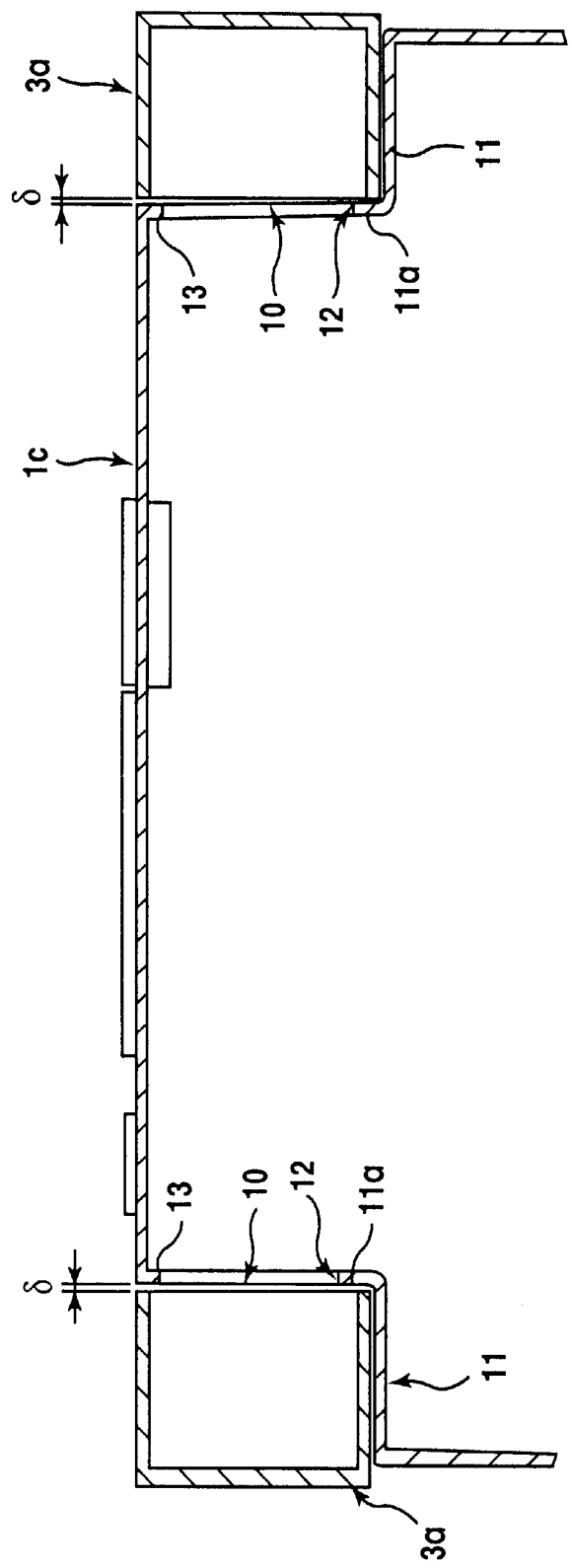
FIG. 22 is a cross sectional view of a structure in which the support member and a support member of a display panel are engaged with each other.

The supporting member 3a of the display panel 3 is fit on the upper cover 1a having the structure as described above, as shown in FIG. 22. FIG. 22 is a cross sectional view taken along line b—b shown in FIG. 20.

Referring to FIG. 22, as has been described above, the end portion 11a of each of the holder portions 11 and a corresponding one of the end portions 13 of the supporting member 1c are continuously connected to each other, so that the ring-shaped end surface having a hole 10 is formed at each end of the supporting member 1c. The supporting member 3a (the mounting member) of the display panel 3 is fit on the supporting member 1c so that the ring-shaped end surfaces of the supporting member 1c are held between parts of the supporting member 3a. A gap between each of the ring-shaped end surfaces of the supporting member 1c and the supporting member 3a of the display panel 3, namely a fitting gap δ, is set at a value, for example, equal to or less than 0.2 millimeters.

The fitting gap δ is set at a value so that a water droplet is supported by a surface tension between the ring-shaped end surface of the supporting member 1c and the supporting member 3a of the display panel 3 and does not enter the fitting gap δ.

In addition, the end portion 11a of each of the holder portions 11 is higher than the end portion 13 of the supporting member 1c. As a result, the width of a predetermined part, including a bottom of the ring, (corresponding to the end portion 11a of the holder portion 11) of the ring-shaped end surface is greater than the width of another part (corresponding to the end portion 13 of the supporting member 1c) of the ring-shaped end surface.

According to such a structure, even if water enter the fitting gap δ, the water is prevented from going over the end portion 11a (the predetermined part including the bottom of the ring) of the holder portion 11 and entering the upper cover 1a.

In addition, an inner surface 12 of the end portion 11a of the holder portion 11 is tapered so as to become narrower towards the inside of the supporting member 1c. Thus, it is further difficult for the water to go over the end portion 11a of the holder portion 11.

According to the connection structure of the upper cover 1a and the supporting member 3a of the display panel 3 as has been described above, the water can be certainly prevented from entering the upper cover through the connection portion.

The present invention is not limited to the aforementioned embodiments, and other variations and modifications may be made without departing from the scope of the claimed invention.

The present specification is based on Japanese priority application No.9-193568 filed on Jul. 18, 1997 and Japanese priority application No.10-193281 filed on Jul. 8, 1998, the entire contents of which are hereby incorporated by reference.

What is claimed is:

1. A terminal unit comprising a housing containing a mechanism for processing an information recording card, said housing having a slit into which the card is inserted, wherein the slit is provided in a side surface of said housing, and wherein an upper portion of said side surface adjacent an upside of the slit contains a projection that overhangs outward with respect to a lower portion of said side surface at an underside of the slit, said projection on said upper portion of the side surface, on which the slit is formed, having a surface portion adjacent the slit which is inclined outwardly from said side surface so as to extend outwardly from an intersection of said upper portion of said slit with said surface of said housing.

2. The terminal unit as claimed in claim 1, wherein an edge of said slit lower portion is chamfered.

3. A terminal unit as claimed in claim 1, and further comprising:

a first cover;

a second cover integrated with said first cover, said first cover and said second cover being a part of said housing of said terminal unit, wherein said first cover has a connecting part including a groove portion and said second cover has a connecting part including a projection portion, the groove portion and the projection portion being engaged with each other so that said first cover and said second cover are integrated with each other.

4. A terminal unit as claimed in claim 1, and further comprising an upper surface of said housing connected to said side surface is inclined so as to be gradually convergent toward a boundary between said side surface and said upper surface, and wherein a projection extending upwardly from said upper surface is formed near the boundary between said upper surface and said side surface, said projection being adjacent said slit and extended in a direction parallel to a longitudinal direction thereof.

5. The terminal unit as claimed in claim 1, wherein said slit being parallel to an installation surface, on which said terminal unit is installed, so that said card in said slit is parallel to the installation surface.

6. The terminal unit as claimed in claim 1, wherein said slit is extended in a horizontal direction from one end of said side surface to another end thereof so that said card is movable in said slit from said one end of said side surface to said another end thereof.

7. The terminal unit as claimed in claim 6, wherein said terminal unit is installed on an installation surface so that said slit laces an operator of said terminal unit.

8. The terminal unit as claimed in claim 1, wherein projections for preventing water drops from entering said mechanism are formed at an innermost portion of said slit.

9. A terminal unit comprising a housing containing a mechanism for processing an information recording card and having a slit into which the card is inserted, wherein the slit is provided on a side surface of said housing, wherein a slit upper portion in an upside of the slit overhangs outward with respect to a slit lower portion at an underside of the slit, wherein a card guide is attached to said side surface at an innermost portion of the slit, said card guide having a closed inner end for limiting a position of a leading edge of the card inserted in said slit, and wherein a pair of opposed projections are formed at an end of said card guide for projecting toward an upper surface and a lower surface, respectively, of a card inserted into the slit.

10. The terminal unit as claimed in claim 9, wherein said card guide is attached to said housing side surface at the innermost portion of said slit, said card guide having a closed inner end for limiting a position of a leading edge of said card inserted in said slit, and wherein said projections are formed in said card guide.

11. A terminal unit comprising a housing containing a mechanism for processing an information recording card, said housing having a slit into which the card is inserted, wherein the slit is provided in a side surface of said housing, and wherein an upper portion of said side surface adjacent an upside of the slit contains a projection that overhangs outward with respect to a lower portion of said side surface at an underside of the slit; and a cover body including:

a supporting member formed on said cover body and having arcuate recesses and ring-shaped end surfaces; and a mounting member mounting a display panel on said supporting member, said mounting member having ring-shaped end surfaces received in said recesses and held between parts of said supporting member, wherein a fitting gap is provided between said supporting member and said mounting member, said fitting gap being set at a dimensional value such that a water droplet is supported by a surface tension between said supporting member and said mounting member.

12. The terminal unit as claimed in claim 11, wherein a width of an end portion, including a bottom of each of the ring-shaped surfaces of said arcuate recesses of said mounting member is greater than a width of each of the adjacent ring-shaped end surfaces of said supporting member.

13. The terminal unit as claimed in claim 12, wherein an inner surface of each of said ring-shaped ends of said supporting member is tapered so as to become narrower toward the inside of said supporting member.

14. The terminal unit comprising a housing containing a mechanism for processing an information recording card, said housing having a slit into which the card is inserted, wherein the slit is provided in a side surface of said housing, and wherein an upper portion of said side surface adjacent an upside of the slit contains a projection that overhangs outward with respect to a lower portion of said side surface at an underside of the slit, and wherein a projection is formed on an upper surface of said housing near a boundary between said upper surface and said side surface, said projection being extended in a longitudinal direction of said slit so that water drops running on said upper surface are stopped and guided toward side ends of said upper surface by said projection.

* * * * *